(12) United States Patent
Totani et al.

(10) Patent No.: US 8,305,201 B2
(45) Date of Patent: Nov. 6, 2012

(54) ANTITHEFT DEVICE FOR VEHICLE

(75) Inventors: Tsutomu Totani, Aichi (JP); Atsushi Shinoda, Aichi (JP)

(73) Assignee: Beat-Sonic Co., Ltd., Aichi (JP)

( * ) Notice: Subject to any disclaimer, the term of this patent is extended or adjusted under 35 U.S.C. 154(b) by 204 days.

(21) Appl. No.: 12/835,074

(22) Filed: Jul. 13, 2010

(65) Prior Publication Data

US 2011/0205041 A1    Aug. 25, 2011

(30) Foreign Application Priority Data

Feb. 25, 2010    (JP) ................................. 2010-040259

(51) Int. Cl.
*B60R 25/10* (2006.01)
(52) U.S. Cl. .................. 340/426.1; 340/430; 340/425.5; 340/426.28; 340/428; 340/426.3
(58) Field of Classification Search .................. 340/430, 340/425.5, 426.28, 428, 426.3; 307/10.1, 307/10.2
See application file for complete search history.

(56) References Cited

U.S. PATENT DOCUMENTS

| | | | | |
|---|---|---|---|---|
| 4,891,478 A | * | 1/1990 | Gold et al. | 200/61.66 |
| 5,360,997 A | * | 11/1994 | Watson | 307/10.1 |
| 5,477,206 A | * | 12/1995 | Rodriguez, Sr. | 340/430 |

FOREIGN PATENT DOCUMENTS

| | | |
|---|---|---|
| JP | U-S58-158724 | 10/1983 |
| JP | A-64-056250 | 3/1989 |
| JP | A-H04-8183 | 1/1992 |
| JP | A-H06-270767 | 9/1994 |
| JP | A-H09-48324 | 2/1997 |
| JP | A-2000-038113 | 2/2000 |

OTHER PUBLICATIONS

Office Action mailed Nov. 21, 2011 in corresponding JP Application No. 2010-040259 (and English translation).

* cited by examiner

*Primary Examiner* — Daryl Pope

(74) *Attorney, Agent, or Firm* — Posz Law Group, PLC

(57) ABSTRACT

An antitheft device for a vehicle includes a main ignition switch, an auxiliary ignition switch disposed at a location which is predetermined so that a driver, when seated on a driver's seat, can operate the auxiliary ignition switch and the auxiliary ignition switch is invisible in a vehicle interior, and an engine start unit including an engine start signal cutoff unit which is connected to the auxiliary ignition switch. When the main and auxiliary ignition switches are turned on, the engine start signal cutoff unit is turned on so that the engine start unit delivers an engine start signal.

3 Claims, 4 Drawing Sheets

ANTITHEFT DEVICE FOR VEHICLE

CROSS-REFERENCE TO RELATED APPLICATIONS

This application is based upon and claims the benefit of priority from the prior Japanese Patent Application No. 2010-40259, filed on Feb. 25, 2010, the entire contents of which are incorporated herein by reference.

BACKGROUND

1. Technical Field

The present disclosure relates to an antitheft device for vehicles, which prevents the vehicles from being thieved.

2. Related Art

An ignition key has conventionally been used to start an engine of automobile. The ignition key can readily be duplicated, and accordingly, there is a possibility that the automobile may be thieved using the duplicated ignition key. An immobilizer has been provided as an example of vehicle antitheft device which is used together with the ignition key. The immobilizer is a type of key using an electronically formed identification code and includes a subcode receiving unit and a code verification unit. The subcode receiving unit receives a subcode embedded in a transponder device provided in the ignition key. The code verification unit collates the subcode at the transponder side with a main code at the immobilizer side. As the result of collation, when the subcode corresponds with the main code, a normal ignition key is determined to be used, whereupon the automobile can be started. This prevents theft with the use of a duplicated ignition key.

However, a person who has illegally obtained a normal ignition key can easily thieve the automobile irrespective of an identification code of the immobilizer. Furthermore, a person who totally knows an electric system of the automobile closes an electric circuit around the ignition key to start the engine irrespective of provision of the vehicle antitheft device such as the above-mentioned ignition key or immobilizer.

In view of the foregoing problem, for example, Japanese Patent Application Publications JP-A-H01-56250 and JP-A-2000-38113 disclose vehicle antitheft devices both of which are provided with auxiliary input units using a keyboard, numerical keypads or a contactless IC card as well as the immobilizers, respectively. In each disclosed antitheft device, an auxiliary input operation such as input of a password is carried out in addition to a physical antitheft device and an electronic antitheft device both of which comprise the immobilizer.

However, when the auxiliary input unit as described above is used, an input terminal of the contactless IC card or a terminal device such as numerical keypads is installed at a place where the terminal or terminal device is easily visible for the purpose of easy input operation. Accordingly, there is a possibility that the terminal device may be disconnected from a circuit and the vehicle may be thieved by bypassing the auxiliary input unit.

SUMMARY

Therefore, an object of the present disclosure is to provide an antitheft device for an automobile, which has a simpler configuration and only a legitimate owner of the vehicle can operate.

According to one aspect of the present disclosure, there is provided an antitheft device for a vehicle, comprising a main ignition switch, an auxiliary ignition switch provided at a location which is predetermined so that a driver, when seated on a driver's seat, can operate the auxiliary ignition switch and the auxiliary ignition switch is invisible from a vehicle interior, and an engine start unit including an engine start signal cutoff unit which is connected to the auxiliary ignition switch, wherein when the main and auxiliary ignition switches are turned on, the engine start signal cutoff unit is turned on so that the engine start unit delivers an engine start signal.

DETAILED DESCRIPTION

Figure 1:
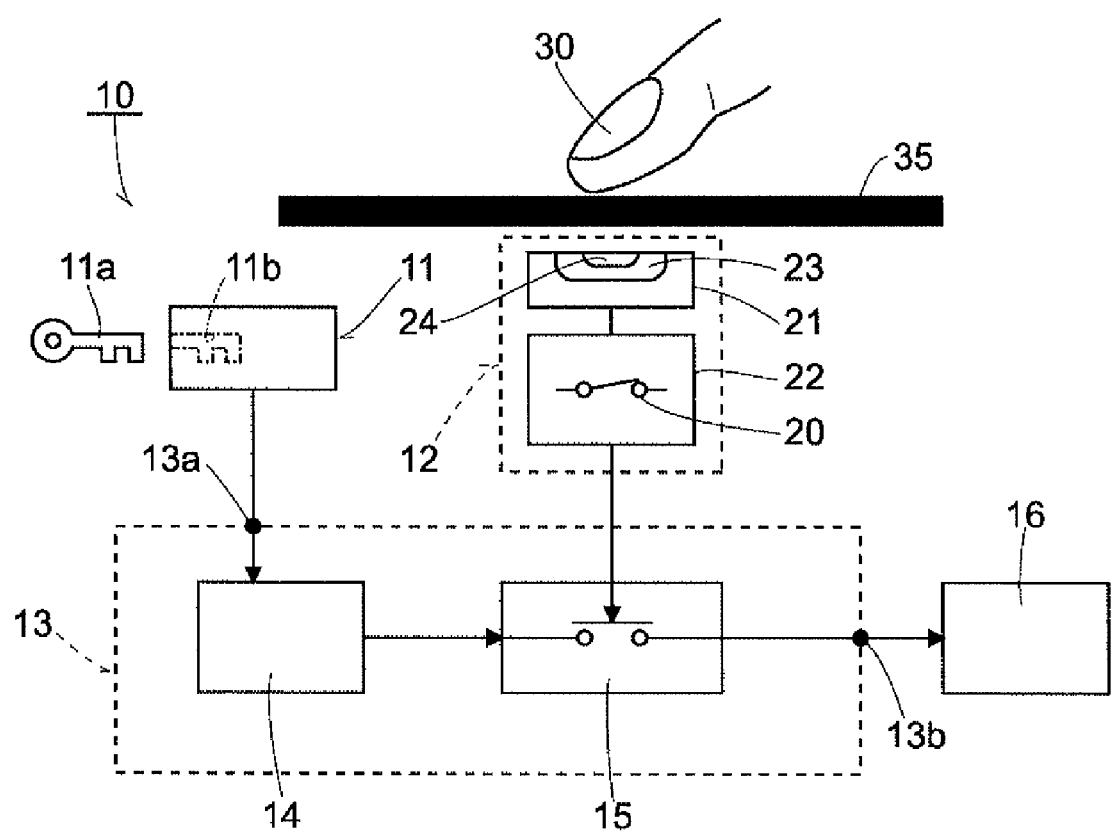
FIG. 1 is a schematic block diagram showing an electrical configuration of the antitheft device for a vehicle according to a first embodiment.
Figure 2:
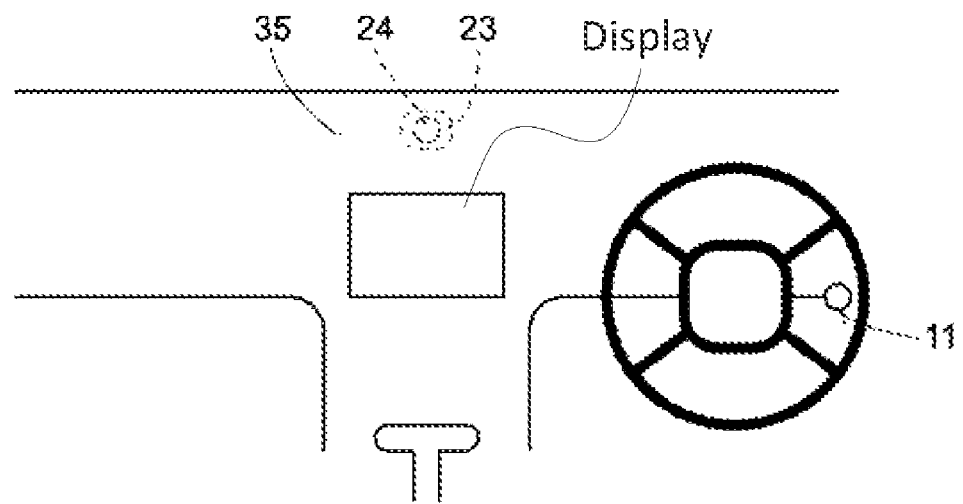
FIG. 2 is a schematic view showing an example of installation of the antitheft device.

Several embodiments will be described with reference to the accompanying drawings. Referring to FIG. 1, an electrical configuration of the vehicle antitheft device 10 according to the first embodiment is schematically shown. The antitheft device 10 includes a main ignition switch 11, an auxiliary ignition switch 12 and an engine start unit 13 as shown in FIG. 1.

The main ignition switch 11 has a standby mode in which the main ignition switch 11 renders the engine startable when turned on, an engine start mode in which the main ignition switch 11 starts the engine and an engine stop mode in which the main ignition switch 11 stops the engine. Although the main ignition switch 11 includes an ignition key 11a and a key cylinder 11b into which the ignition key 11a is insertable in the embodiment, the main ignition switch 11 may include a push-button switch or a touch panel, instead.

The auxiliary ignition switch 12 includes a detection unit 21 and a control unit 22.

The detection unit 21 has a sensor 23 provided with a detecting portion 24 which detects proximity of an object to be detected. The sensor 23 is a proximity sensor which delivers a detection signal to the control unit 22 when the object to be detected approaches within a range of distance that is not more than a predetermined distance. The sensor 23 may be a touch sensor which has a reduced sensitivity and detects abutment of the object to be detected, instead. Although the object to be detected is a finger 30 or palm of a human body as shown in FIG. 1, a contactless IC card or the like may be employed, instead.

The control unit 22 includes an auxiliary ignition switch body 20 which is turned on when a detection signal is delivered from the detection unit 21 thereto, whereby the auxiliary ignition switch 12 is turned on.

Furthermore, the sensor 23 of the auxiliary ignition switch 12 is disposed so that a driver seated on a driver's seat can operate the sensor 23 and so that the sensor 23 is invisible from a vehicle interior, for example, on the reverse of a dashboard panel. As a result, the location of the auxiliary ignition switch 12 can be kept secret from persons other than the vehicle owner without spoiling the operability of the auxiliary ignition switch 12. Although the sensor 23 is disposed on the reverse of the dashboard panel in the embodiment, the sensor 23 may be disposed at any location where a person seated on the driver's seat cannot easily view the sensor 23, for example, between the vehicle body and the interior thereof.

The engine start unit 13 includes an engine start signal generating device 14, an engine-start-signal cutoff device 15 and an engine start device 16. The engine start signal generating device 14 is provided with an input terminal 13a to which a start signal generated by the main ignition switch 11 is delivered. Thus, the engine start signal generating device 14 delivers an engine start signal, based on the input of the start signal from the main ignition switch 11. The engine-start-signal cutoff device 15 is disposed behind the engine start signal generating device 14. The auxiliary ignition switch 12 is connected to the engine start signal generating device 14. The engine-start-signal cutoff device 15 is provided with an output terminal 13b from which an engine start signal is delivered.

When the auxiliary ignition switch 12 is turned on, the engine-start-signal cutoff device 15 is turned on so that the engine start signal generated by the engine start signal generating device 14 is delivered from the output terminal 13b to the engine start device 16. The engine start device 16 has the same configuration as a conventional device including an electric motor, ignition coil and the line and accordingly, the description of the engine start device 16 will be eliminated.

The above-described antitheft device 10 will work as follows. When the ignition key 11a is inserted into the key cylinder 11b and the main ignition switch 11 is turned on, the switch 11 is switched from the engine stop mode to the standby mode in which the engine is startable. When the ignition key 11a is then rotated, the main ignition switch 11 is switched from the standby mode to the engine start mode. The main ignition switch 11 delivers a start signal. The delivered start signal is supplied via the input terminal 13a of the engine start unit 13 to the engine start signal generating device 14. The engine start signal generating device 14 generates the engine start signal, based on the start signal. The generated engine start signal is delivered to the engine start signal cutoff device 15. Since the engine start signal cutoff device 15 is shut off at this moment, the engine start signal is not delivered to the output terminal 13b.

The driver then moves his/her finger 30 closed to the sensor 23 of the auxiliary ignition switch 12. When the finger 30 approaches within a range of distance that is not more than a predetermined distance, the detection unit 21 delivers a detection signal to the control unit 22, which then turns on the auxiliary ignition switch 12. Upon turn-on of the auxiliary ignition switch 12, the engine start signal cutoff device 15 is turned on. As a result, the engine start signal is delivered via the output terminal 13b to the engine start device 16. Thus, the engine can be started when both main and auxiliary ignition switches 11 and 12 are turned on concurrently as described above.

The sensor 23 of the auxiliary ignition switch 12 is concealed on the reverse of the dashboard panel. Accordingly, a person other than the vehicle's owner or driver who does not know the location of the sensor 23 cannot start the engine. Consequently, the auxiliary ignition switch 12 can be prevented from being found and accordingly, the vehicle can be prevented from being thieved.

Figure 3:
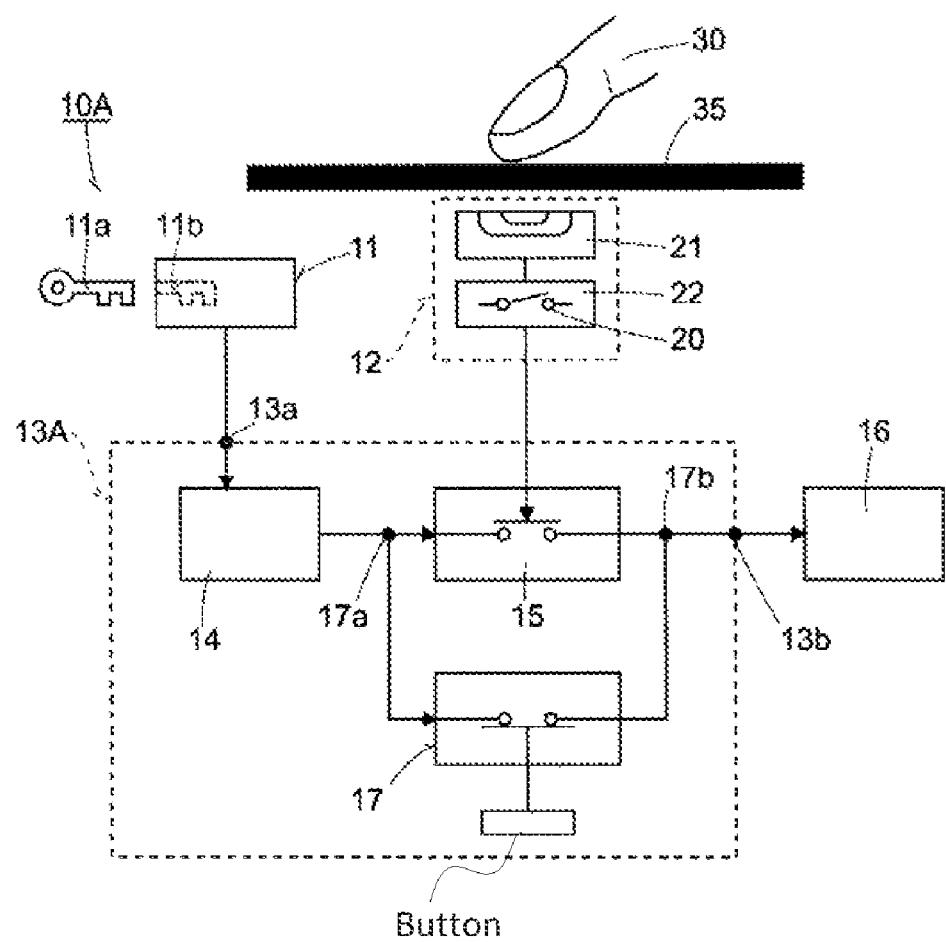
FIG. 3 is a schematic block diagram showing an electrical configuration of the antitheft device for a vehicle according to a second embodiment.

FIG. 3 illustrates the vehicle antitheft device 10A according to a second embodiment. Configurations of the main and auxiliary ignition switches 11 and 12 will not be described in the second embodiment since the switches 11 and 12 have the same configurations as those in the first embodiment respectively.

The engine start unit 13A comprises the engine start signal generating device 14, the engine start signal cutoff device 15, the engine start device 16 and a bypass switch 17. Since the engine start signal generating device 14, the engine start signal cutoff device 15 and the engine start device 16 in the second embodiment have the respective same configurations as those in the first embodiment, description of these devices 14 to 16 will be eliminated. The bypass switch 17 has an input terminal 17a and an output terminal 17b and is disposed at a location which differs from the location of the auxiliary ignition switch 2. The engine start signal cutoff device 15 is located between the input and output terminals 17a and 17b.

The vehicle antitheft device 10A configured above will work as follows. The engine is started in the same manner as in the first embodiment when the main and auxiliary ignition switches 11 and 12 are turned on concurrently. Accordingly, the description will be eliminated.

When the bypass switch 17 is turned off, the engine start signal is transmitted through the engine start signal cutoff device 15 side. Accordingly, when the bypass switch 17 is turned on, the engine start signal can be delivered to the engine start device 16 even if the auxiliary ignition switch 12 is turned off. Thus, since a person other than the vehicle's owner can start the engine, the vehicle antitheft device 10A can be disabled when the vehicle is let out or has repaired.

Furthermore, since the bypass switch 17 is disposed at the location differing from the location of the auxiliary ignition switch 2, it is difficult to dismount the auxiliary ignition switch without asking leave of the vehicle's owner. Consequently, the vehicle antitheft effect can be improved.

Figure 4:
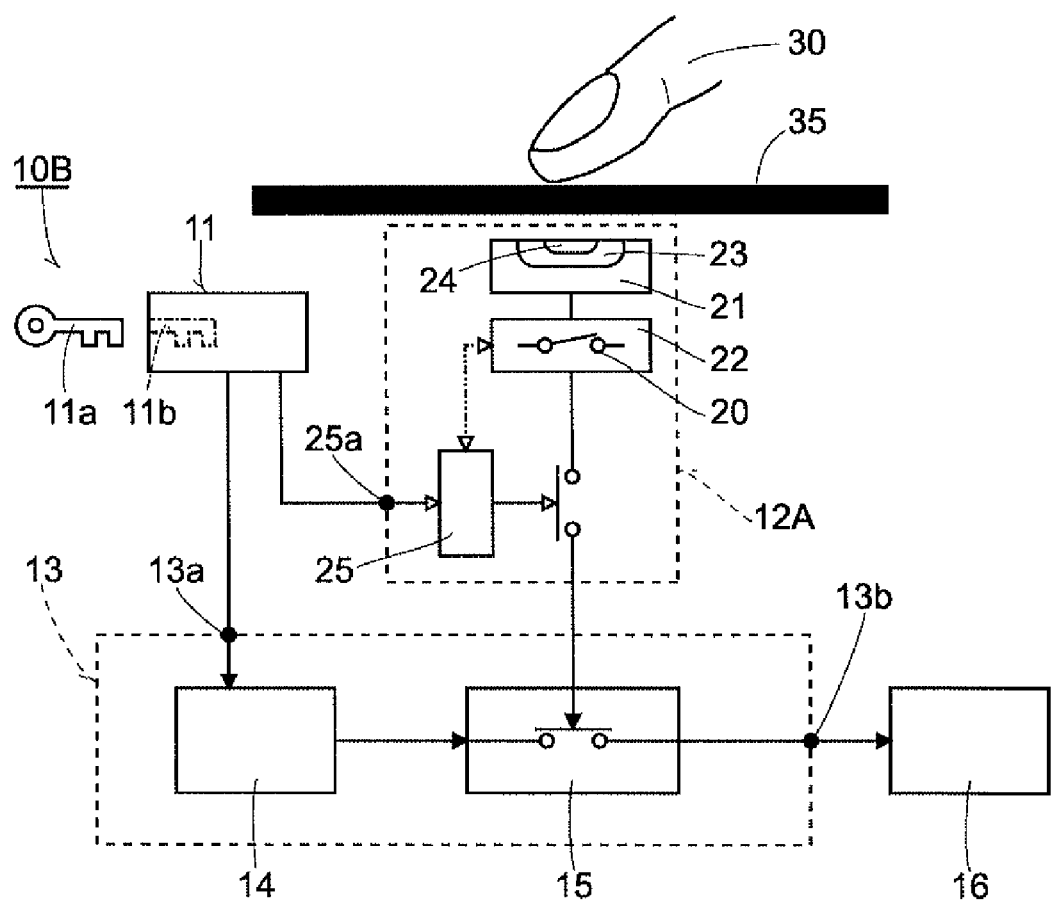
FIG. 4 is a schematic block diagram showing an electrical configuration of the antitheft device for a vehicle according to a third embodiment.

FIG. 4 illustrates the vehicle antitheft device 103 according to a third embodiment. Configurations of the main ignition switch 11 and the engine start unit 13 will not be described in the third embodiment since the main ignition switch 11 and the engine start unit 13 have the same configurations as those in the first embodiment respectively.

The auxiliary ignition switch 12A has the detection unit 21, the control unit 22 and a switch-status holding device 25 which holds the status of the auxiliary ignition switch 20. Since the detection unit 21 and the control unit 22 in the third embodiment have the respective same configurations as those in the first embodiment, description of these devices 14 to 16 will be eliminated.

The switch-status holding device 25 is connected so as to turn on or off a signal line between the auxiliary ignition switch body 20 and the engine start signal cutoff device 15. The switch-status holding device 25 has an input terminal to which is delivered an on-signal that is generated by the main ignition switch 11 when the switch 11 is in an on-state. After the auxiliary ignition switch body 20 is switched to the on-state, the switch-status holding device 25 holds the switch body 20 in the on-state based on the on-signal of the main ignition switch 11, thereby holding the switch 12A in the on-state.

The main ignition switch 11 has the standby mode in which the main ignition switch 11 renders the engine startable when turned on, the engine start mode in which the main ignition switch 11 starts the engine and the engine stop mode in which the main ignition switch stops the engine. When the main ignition switch 11 is in an off-state, the ignition key 11e is detached from the key cylinder 11b. Accordingly, when the ignition key 11a is inserted into the key cylinder 11b such that the main ignition switch 11 is in the standby mode or the engine start mode, the switch-status holding device 25 can hold the auxiliary ignition switch body 20 in the on-state.

The vehicle antitheft device 10B configured above will work as follows. The engine is started in the same manner as in the first embodiment when the main and auxiliary ignition switches 11 and 12 are turned on concurrently. Accordingly, the description will be eliminated.

The main ignition switch 11 delivers an on-signal to the switch-status holding device 25 when the main ignition switch 11 has been returned from the engine start mode to standby mode after start of the engine and the main ignition switch 11 is in the on-state. On this occasion, the auxiliary ignition switch body 20 is held in the on-state. Accordingly, the driver can quickly re-start the engine without re-operation of the auxiliary ignition switch 12 even when idling of the engine is stopped during wait for the traffic light to change. Consequently, the vehicle antitheft effect can be improved without degrading the operability of the vehicle antitheft device 10B.

The foregoing description and drawings are merely illustrative and are not to be construed in a limiting sense. Various changes and modifications will become apparent to those of ordinary skill in the art. All such changes and modifications are seen to fall within the scope as defined by the appended claims.

What is claimed is:

1. An antitheft device for a vehicle, comprising:
   a main ignition switch;
   an auxiliary ignition switch provided at a location which is predetermined so that a driver, when seated on a driver's seat, can operate the auxiliary ignition switch and the auxiliary ignition switch is invisible from a vehicle interior; and
   an engine start unit including an engine start signal cutoff unit which is connected to the auxiliary ignition switch,
   wherein when the main and auxiliary ignition switches are turned on, the engine start signal cutoff unit is turned on so that the engine start unit delivers an engine start signal, and
   the auxiliary ignition switch includes a proximity sensor which delivers a detection signal when an object to be detected approaches within a range of distance that is not more than a predetermined distance.

2. The device according to claim 1, wherein the engine starting unit includes a bypass switch disposed at a predetermined location differing from the predetermined location of the auxiliary ignition switch, and when the bypass switch is turned on, the engine start signal is allowed to be delivered through the bypass switch and disallowed to be delivered through the engine start signal cutoff unit.

3. The device according to claim 1, wherein:
   the main ignition switch has a standby mode in which the main ignition switch renders the engine startable, an engine start mode in which the main ignition switch starts the engine and an engine stop mode in which the main ignition switch stops the engine;
   the auxiliary ignition switch has an auxiliary ignition switch holding device disposed between the proximity sensor and the engine start signal cutoff unit;
   when the main ignition switch is in the engine start mode, the auxiliary ignition switch holding device is turned on so that the detection signal generated by the proximity sensor is delivered to the engine start signal cutoff unit;
   when the main ignition switch is in the standby mode, the auxiliary ignition switch holding device holds the detection signal delivered from the proximity sensor, thereby holding the auxiliary ignition switch in an on-state; and
   when the main ignition switch is in the engine stop mode, the auxiliary ignition switch holding device is turned off.

\* \* \* \* \*